Figure 1:
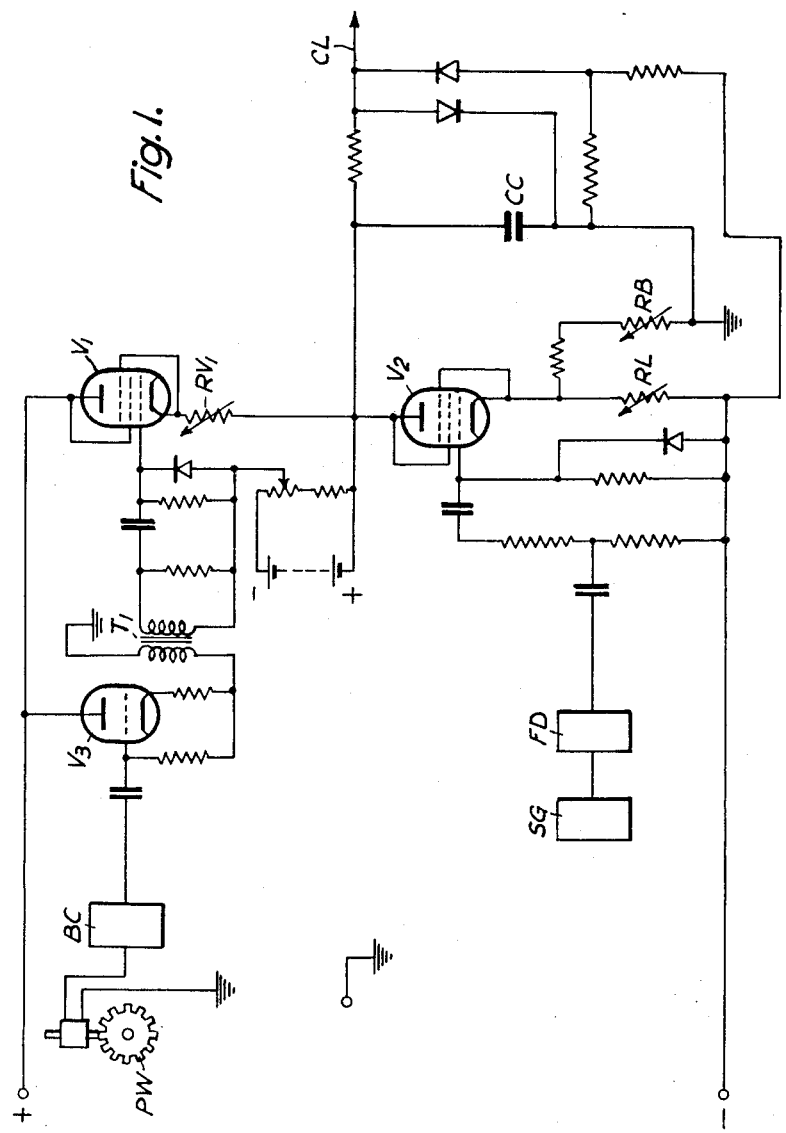

Aug. 15, 1961  W. H. P. LESLIE  2,996,649
MOTOR CONTROL SYSTEM
Filed April 18, 1960  11 Sheets-Sheet 3

Inventor:
William Henderson Paterson Leslie
By
Stevens, Davis, Miller & Mosher
Attorney

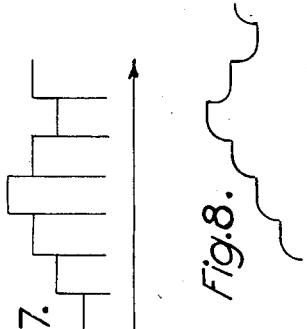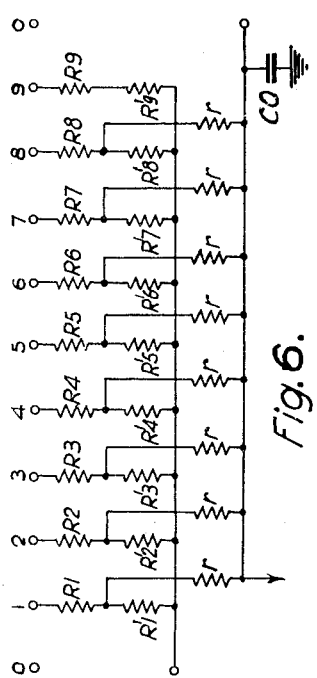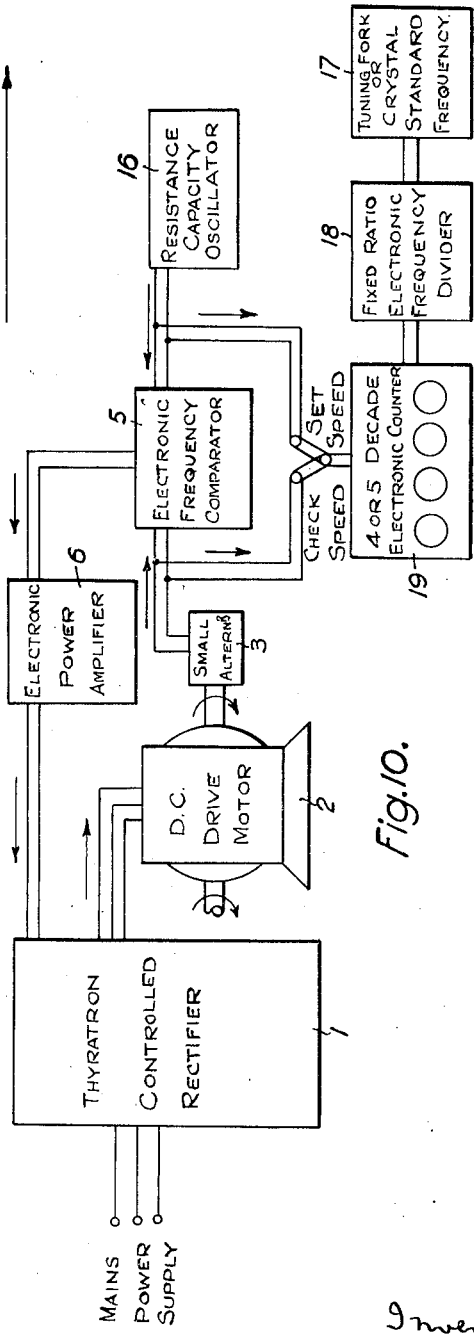

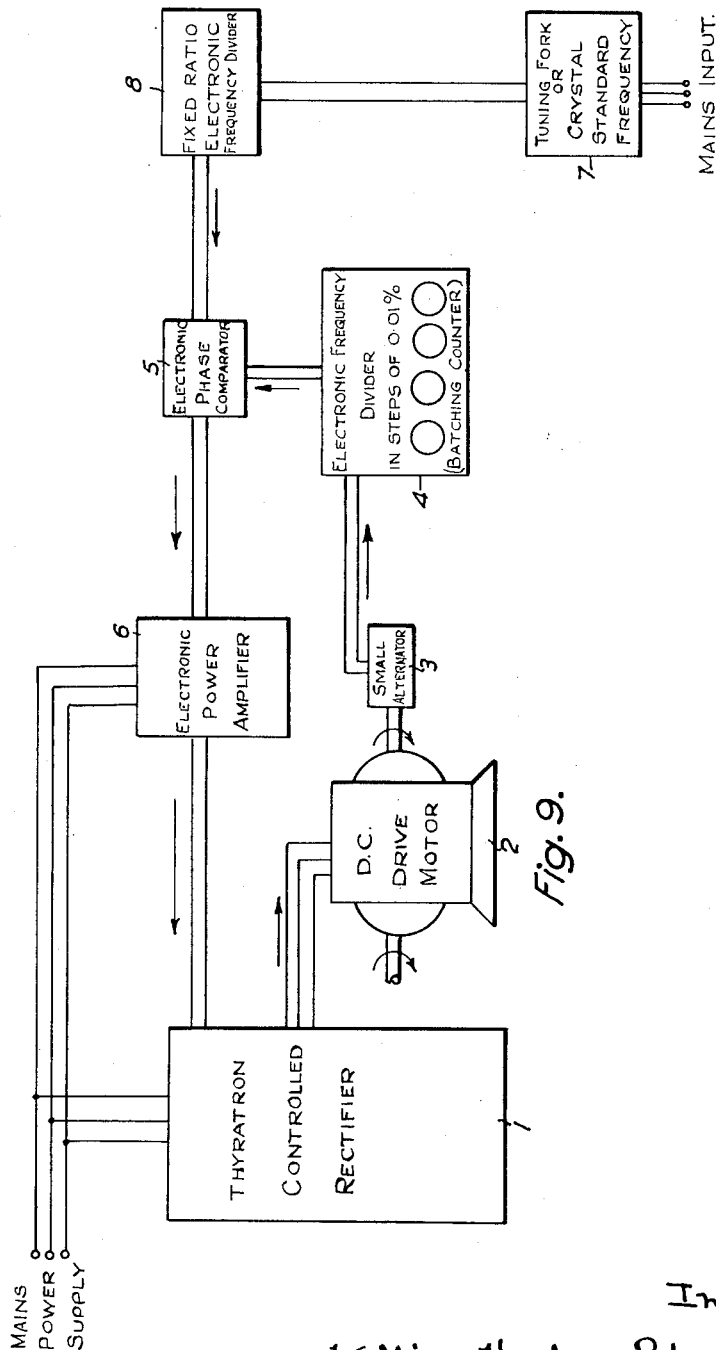

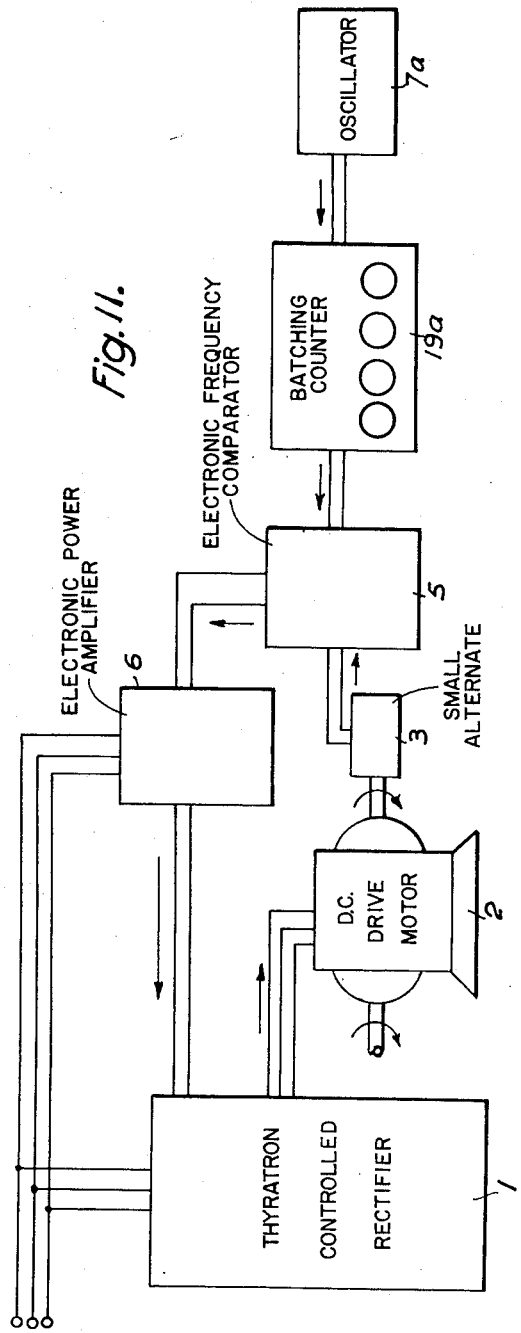

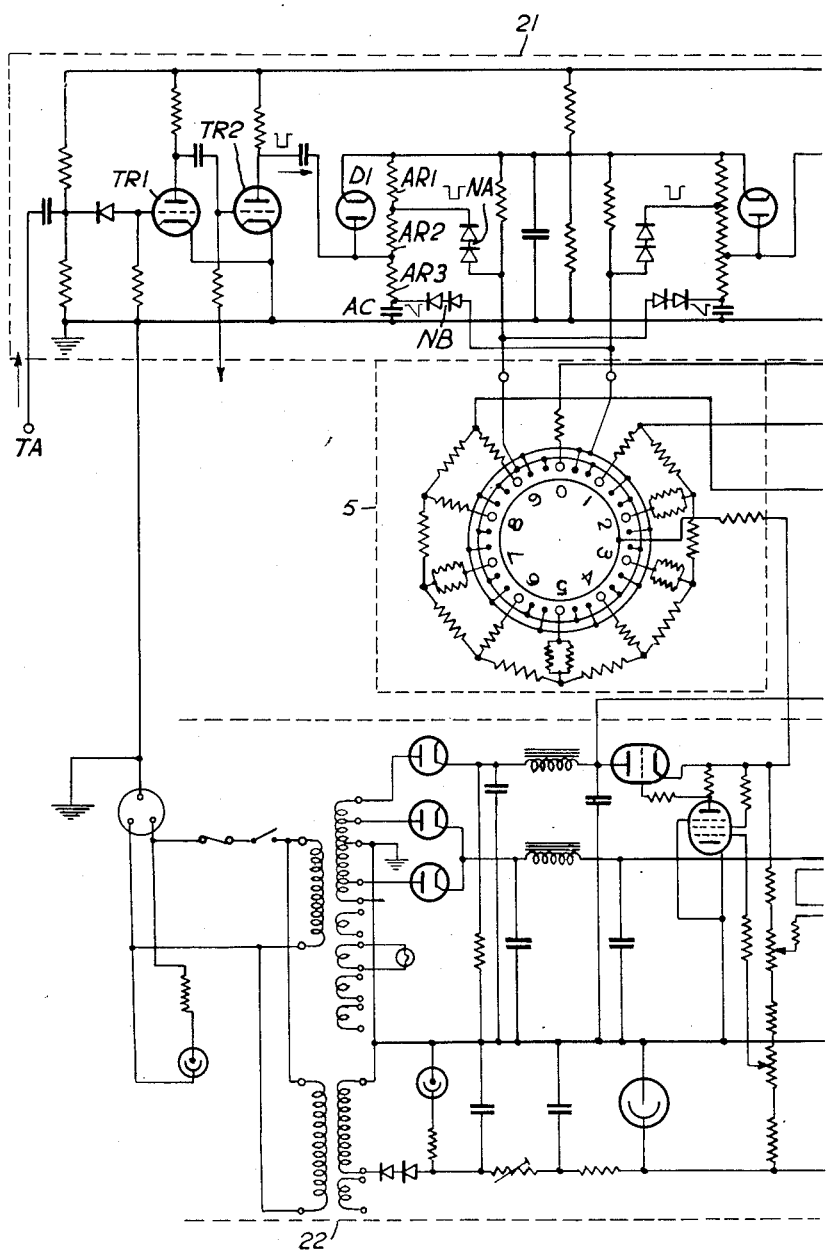
Fig.12.A

Aug. 15, 1961    W. H. P. LESLIE    2,996,649
MOTOR CONTROL SYSTEM
Filed April 18, 1960    11 Sheets-Sheet 8
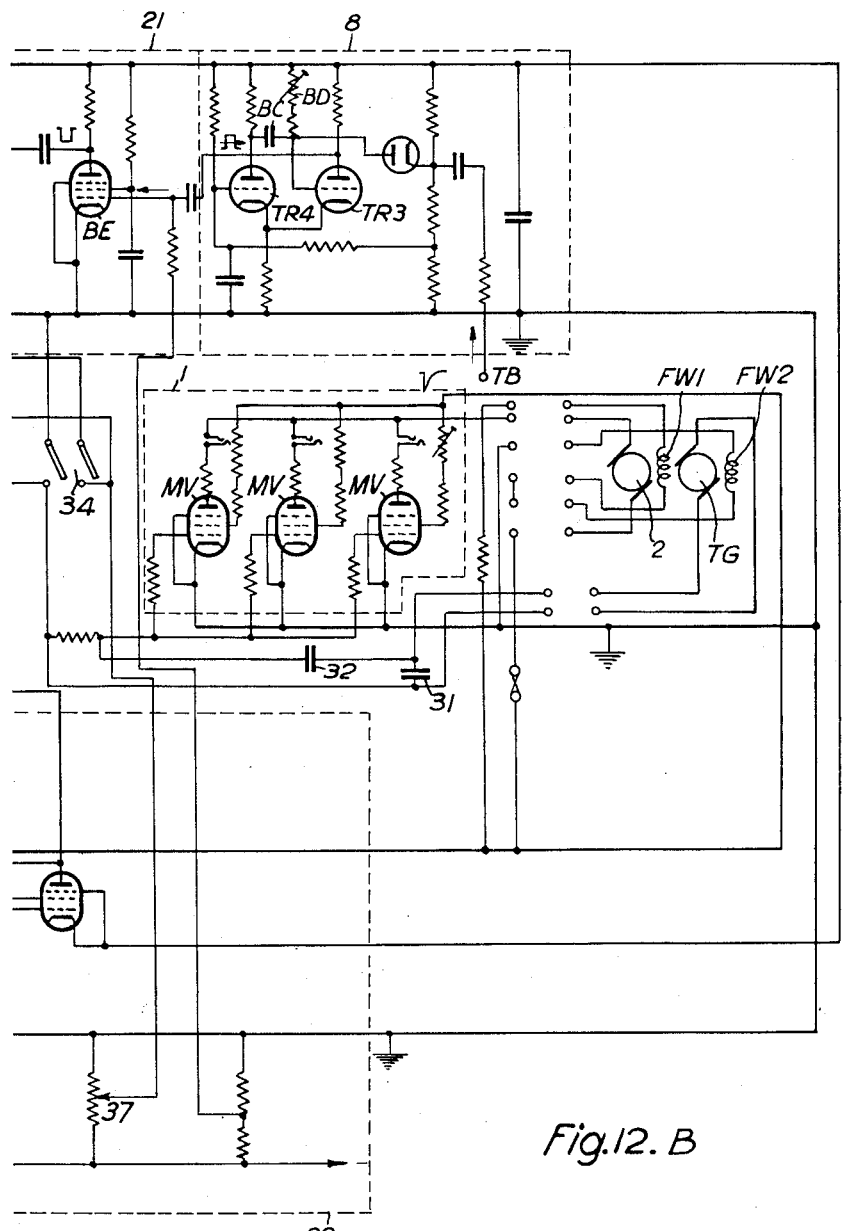
Fig.12.B
Inventor:
William Henderson Paterson Leslie
By
Stevens, Davis, Miller & Mosher
Attorneys Aug. 15, 1961  W. H. P. LESLIE  2,996,649
MOTOR CONTROL SYSTEM
Filed April 18, 1960  11 Sheets-Sheet 10

Inventor:
William Henderson Paterson Leslie
By
Stevens, Davis, Miller & Mosher
Attorneys

United States Patent Office 2,996,649
Patented Aug. 15, 1961

2,996,649
MOTOR CONTROL SYSTEM
William Henderson Paterson Leslie, East Kilbride, Scotland, assignor to National Research Development Corporation, London, England, a corporation of Great Britain
Filed Apr. 18, 1960, Ser. No. 22,750
Claims priority, application Great Britain Apr. 22, 1955
19 Claims. (Cl. 318—314)

This invention is concerned with the problems presented by variations in frequency. In the mechanical field, it is known, for example to measure the difference in speed between two machines by means of a differential gear which produces a rotation of a third shaft corresponding to the difference of speed of the two machines. If one of the machines provides a reference speed and the speed of the other machine is variable, the differential gear can be used to control the speed of the second machine and thus make it equal to that of the reference machine or if change speed gears are provided make it some fraction or multiple of the speed of the reference machine.

This application is a continuation-in-part of my copending application Serial No. 578,820, filed April 17, 1956.

In the electrical field it is well-known for example to compare the frequency of two alternators by suitable connections to an electric lamp, the illumination of which fluctuates at a frequency which is the difference of the frequencies of the two alternators. This scheme is used in the connection of a second alternator to a load circuit already being supplied by a first alternator. Such a scheme cannot itself provide for control of the second alternator, nor does it directly indicate whether the second alternator is running much slower or faster than the first.

The mechanical arrangement above described indicates by the speed of the third shaft the magnitude of the speed difference of the two machines and by the direction of its rotation the sign of the difference of speeds. For the case of control, continuous rotation of the third shaft may be inconvenient, and in that case it is usual to provide a friction clutch at a convenient point between the third wheel and the controller, and stops limiting the amount of rotation of the member driven through the friction clutch.

An object of the present invention is to provide an electrical analogue comprising means for producing electrical pulses at a frequency dependent upon the speed of the machine part, means for producing reference electrical pulses at a determined frequency, and a controller operable by an error signal representative of the difference between the two said frequencies to vary the speed of the machine part in a direction which reduces the error signal in which an electrical comparator counts the difference in the two pulsed signals but only up to a maximum total in either direction, at which the controller remains at a corresponding maximum setting until the two frequencies reach equality, whereupon the comparator produces an error signal dependent upon the phase difference between the pulsed signals.

Another object is to provide the apparatus with frequency changing means for one or both of the pulsed signals.

The invention has further objects which together with the advantages thereof will become apparent from the description which follows.

The mechanical system above referred to has the disadvantage that it can only deal with rotational movements, it can only deal with relatively limited speeds and speed differences, and in consequence of the last mentioned limitation if one machine is an accurate reference machine it can only be used in conjunction with a large range of variable machine speeds by the provision of an elaborate multi-ratio gearbox which requires a very high standard of design and construction making it expensive, and is also in spite of a high standard of maintenance, liable to breakdown. These disadvantages are avoided by the present invention.

An advantage of an electrical differential or comparator which operates by counting is that it is substantially independent of the wave form or amplitude of the pulses; the fact that counting is up to a limit is of little or no practical disadvantage as will be shown later. Furthermore, the electrical differential or comparator can be made up of readily obtainable electrical and electronic units, it is relatively cheap to produce, install and maintain, it is reliable in use and will give a high degree of accuracy. Thus, as applied to the control of the speed of a cyclically moving machine part, for instance the shaft of a direct current electric motor, the speed can be controlled with an error of less than ±0.02 percent.

Figure 2:
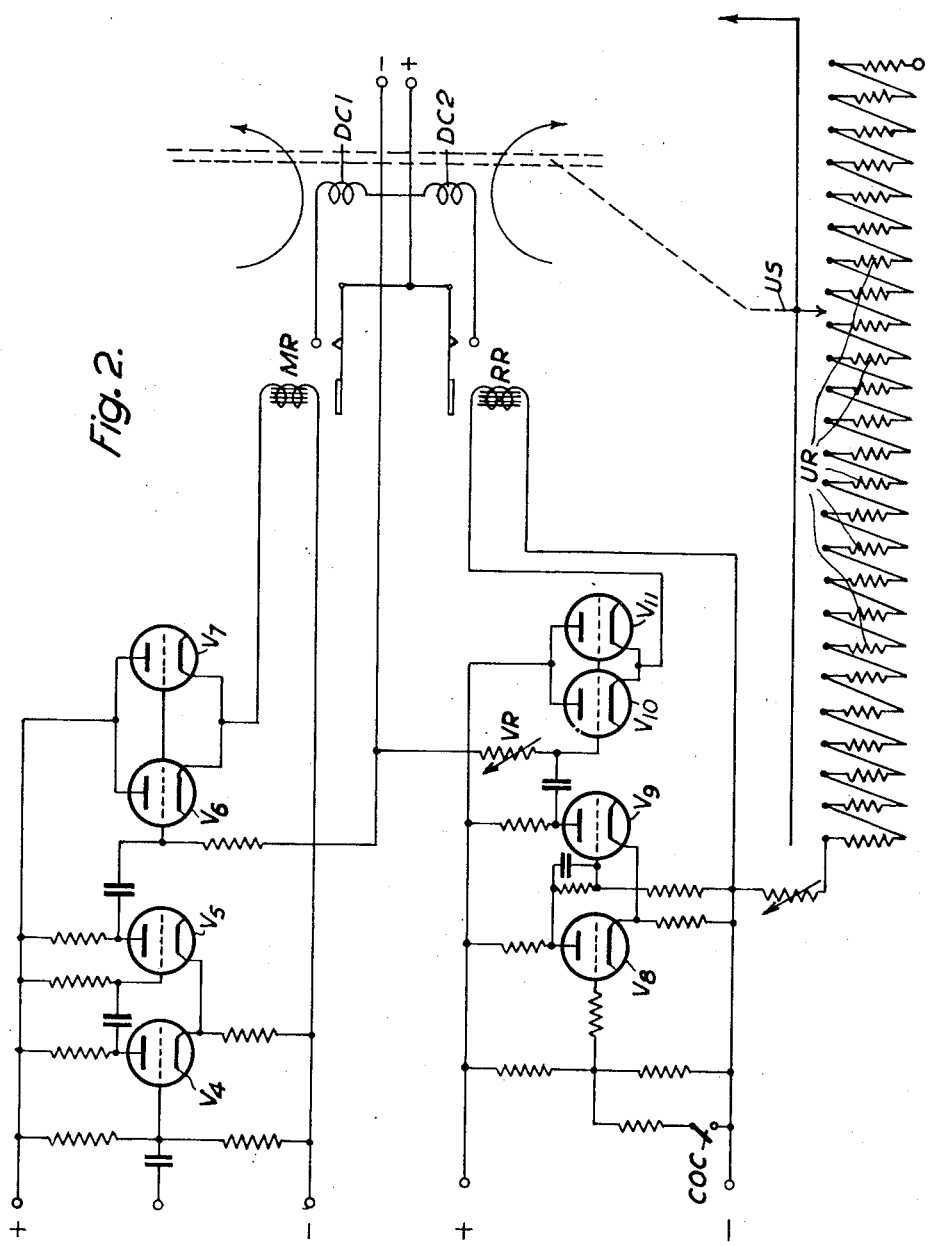

While the application of the invention to the control of machine parts is not limited to electric motors but is applicable also to other rotary machines or to reciprocating machines the speed of which is regulatable as, for example, hydraulic motors, steam, air or internal combustion turbines, or reciprocating engines, energy consuming machines such as electric generators, pumps and mechanical brakes, or hydraulic couplings with variable filling, its application control of the speed of a direct current electric motor is a convenient example and it will therefore be described with more particular reference thereto. The changes necessary to apply the invention to other cases of cyclically moving machine parts will be understood by those skilled in the art. The invention will be further described with reference to the accompanying drawings in which, FIGURE 1 shows the circuit of a motor speed controller employing a comparator in the form of a capacitor, FIGURE 2 shows the circuit of a motor speed controller employing a comparator in which the comparator is a uniselector switch.

Figure 3:
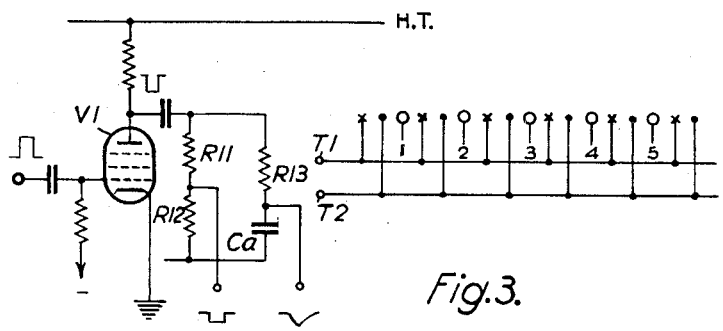
Figure 4:
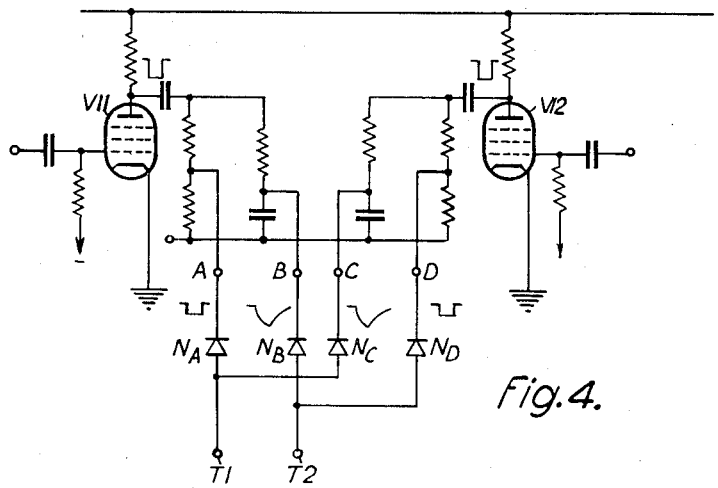
Figure 5:
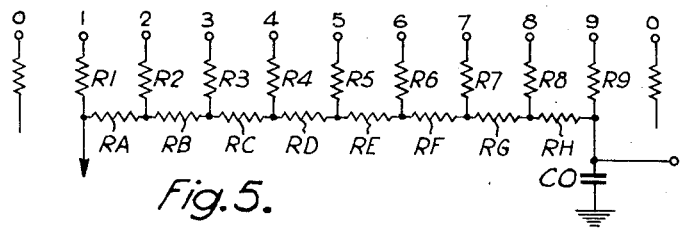
Figure 13:
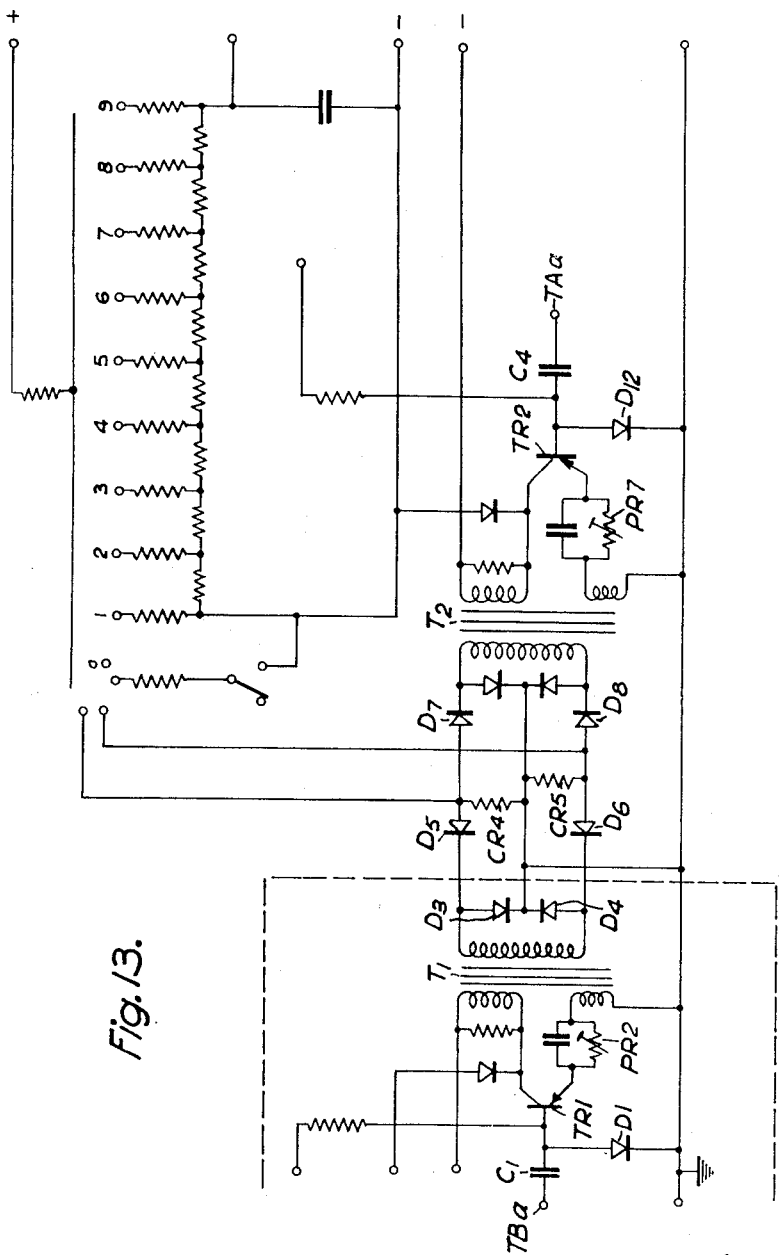
Figure 14:
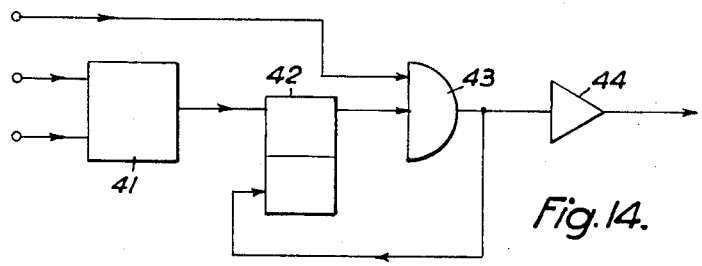
Figure 15:
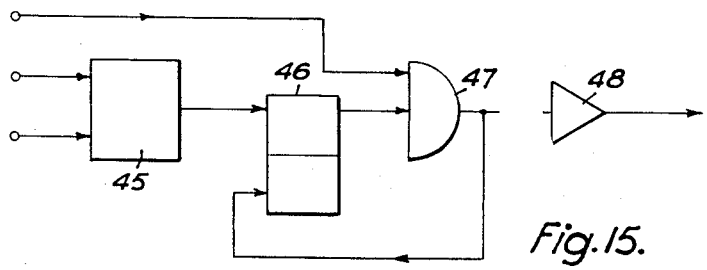
Figure 16:
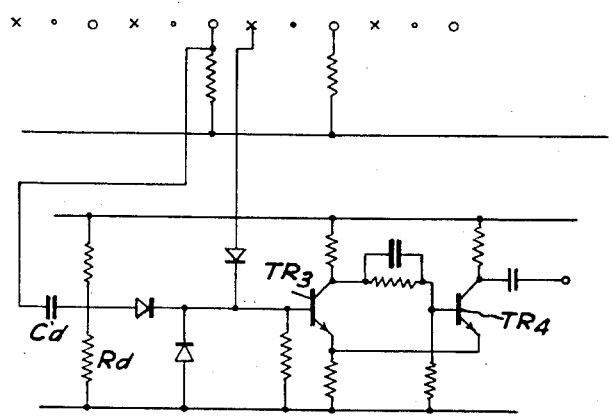
Figure 17:
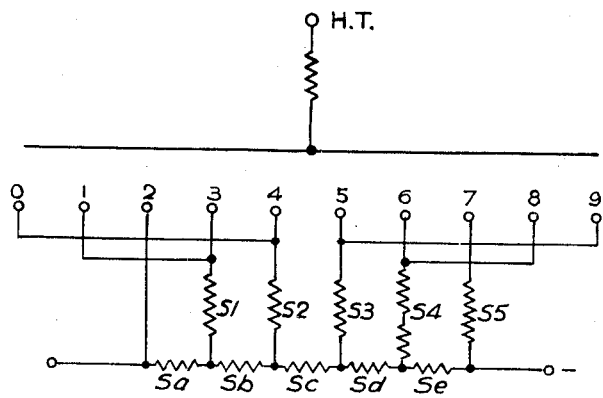
Figure 18:
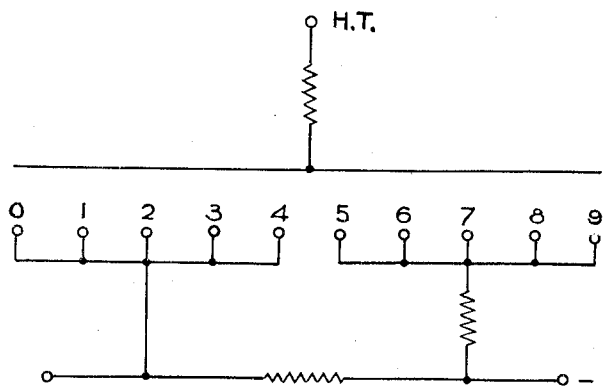

FIGURE 3 shows one known driving circuit for a cold cathode dekatron tube,

FIGURE 4 shows two driving circuits acting in opposition on a cold cathode dekatron tube, FIGURE 5 shows an output circuit for the dekatron tube, FIGURE 6 shows an alternative form of output circuit, FIGURES 7 and 8 show the wave form at the terminals of the output circuit, FIGURES 9, 10 and 11 show three arrangements of motor speed controllers according to the invention in block diagram form, FIGURES 12a and 12b is a circuit diagram of a motor speed controller according to the invention, FIGURE 13 shows an alternative to FIGURE 12, FIGURES 14 and 15 show a development of the invention which provides both fine and coarse control, FIGURE 16 is a circuit diagram of part of FIGURE 13, FIGURES 17 and 18 are output circuit diagrams for the case of a low frequency generator used in certain embodiments of the invention.

The signal from the cyclically moving machine part e.g. motor shaft may conveniently be obtained by a phonic wheel or other alternating current generator or a commutator on the motor shaft. These are all well known devices which do not need to be illustrated or described in any detail. By way of example a phonic wheel is indicated at PW in FIGURE 1. As it is sometimes desirable, as will be explained later to reduce the frequency of the signal so obtained before it is fed to the comparator, a frequency dividing stage may be interposed and a batching counter which is in itself a well known device (see Electronic Engineering, April 1956, p. 138) may conveniently be used for the purpose as diagrammatically indicated at BC in FIGURE 1.

Another purpose for which a frequency changer may be necessary is where speed variation of the moving part is required. In that case a frequency changer to adjust the frequency of one or other of the signals may be provided thereby to maintain the controlled speed accurately at a preselected value. A multi ratio frequency changer will be recognized as analagous to a multi ratio gear box in a mechanical system as above mentioned.

The means for producing the reference signal of standard frequency may be a signal generator of any known kind. Thus if a low frequency is required a simple clock controlled contact may be used, a device well known in itself and an example is described below with reference to FIGURE 2. It may instead be a crystal controlled or tuning fork controlled electronic tube oscillator to maintain the signal frequency accuracy. If the desired frequency is lower than can conveniently be controlled in this manner an electronic frequency divider may be provided to reduce the frequency of the signal produced by the signal generator to a lower harmonic of the signal generator frequency. Since all these devices are in themselves well known they need not be further described, and they are indicated symbolically in the drawings, the generator being marked SG and the frequency divider FD.

The electrical comparator to produce an error signal representative of the difference between the motor speed signal and the reference signal may take several forms as will be described in detail hereinafter.

The controller responsive to the error signal to vary the motor speed may be a hard tube, transistor, magnetic amplifier or thyratron controlled rectifier or similar known device. It is usually desirable to incorporate a power amplifier in the circuit between the comparator and the thyratron rectifier or other motor controller in order to increase the control sensitivity. A specific example is described below with reference to FIGURE 12.

A particularly simple comparator shown in FIGURE 1 is a capacitor. The two sets of pulses derived from the reference frequency source SG and the phonic wheel PW are tailored by pulse forming tube circuits to produce trains of pulses of constant, accurate amplitude and duration. These pulses are applied to a tube circuit so that the controlled parameter, e.g. motor pulses, charge the capacitor by a constant amount each time and the reference pulses discharge the capacitor by the same constant amount. Thus as shown in FIGURE 1 the pulses from the phonic wheel PW are applied to tube $V_3$ in cathode follower connection and the output is applied through a transformer $T_1$ to the control grid of a tube $V_1$ also in cathode follower connection including a load resistor $RV_1$. This circuit charges a capacitor CC constituting the comparator by a predetermined amount at each motor pulse, the precise amount being adjustable by variation of the resistor $RV_1$. The reference pulses are applied to the control grid of another tube $V_2$ having its anode connected to the capacitor CC and its cathode loaded and biassed so that each pulse applied to its grid causes the discharge from the capacitor CC of the same predetermined amount as the charges applied through the tube $V_1$. The amount of each discharge is regulated by adjustment of the load resistor RL and bias resistor RB associated with the tube $V_2$. With this system the capacitor voltage will tend to remain steady at any value within its range when the frequencies are identical or change rapidly when the frequencies vary. This voltage can be used to operate the controller, through the line CL.

This system is simple in conception and operates satisfactorily, but it is susceptible to slight changes in the characteristics of tubes and other circuit components so that it requires more attention than other forms of comparator now to be described.

As above mentioned frequency dividers may be used in either the reference frequency supply or the signal from the controlled motor, such frequency dividers conveniently being in the form of batching counters.

Where a batching counter has divided the motor speed pulses to correspond with reference pulses, the frequencies to be compared may be low (1 to 10 per second). In this case an electromechanical device such as a uniselector switch with two drive coils for opposite directions of rotation can be driven from the reference pulses (to increase output from the controller) and from the controlled parameter, e.g. motor derived pulses (to decrease output). Thus as shown in FIGURE 2 the pulses derived from the phonic wheel or like generator and batching counter are applied through an amplifier based on four tubes $V_4$, $V_5$, $V_6$ and $V_7$ to actuate a relay MR which controls one drive coil $DC_1$ of a bi-directional uniselector switch US. The reference frequency being comparatively low may here be derived from a clock operated contact COC and is applied to an amplifier based on four tubes $V_8$, $V_9$, $V_{10}$ and $V_{11}$ to actuate another relay RR which controls the other drive coil $DC_2$ of the uniselector switch. A chain of resistors UR is connected between the contacts of the uniselector switch across which a voltage is maintained from any convenient source so that the voltage at each contact will be in accordance with the grading of the resistors. Thus by connecting the wiper of the uniselector to the control circuit, the voltage applied to the controller will depend on the position of the wiper in relation to the contacts. This arrangement will cause the motor speed to be brought to a value at which the frequency of the two signals is nearly equal, the selector switch jumping back and forward one contact. A variable resistor VR conveniently in the amplifier of the reference frequency enables the pulse width of the one train to be adjusted to ensure that the durations of excitation of the two drive coils are equal so that the net movement is zero if the pulses of the two trains coincide.

Instead of using a mechanical switch a purely electronic circuit may be used, which can perform the above duty at the low frequency and also at the higher frequencies involved where the comparison is made between the controlled parameter, e.g. motor derived pulses, and pulses derived from a reference source and batching counter, or derived from a resistance capacity oscillator. In this case, one or more cold cathode dekatron counting valves can be connected so that the count increases due to reference pulses and decreases due to motor derived pulses. The output electrodes can be connected to give an output voltage proportional to or varying with count. This signal can then be fed to the controller and used to vary the motor speed to maintain it at the desired value.

Before describing in detail the mode of counting in either direction by a dekatron tube it will be convenient to describe briefly the driving circuit shown in FIGURE 3 which is in itself known. The pulses to be counted are applied to the grid of valve $V_1$ and the resulting anode pulses are applied to two potential dividers $R_{11}$, $R_{12}$ and $R_{13}$, $Ca$. $R_{11}$, $R_{12}$, $R_{13}$ are resistances, and $Ca$ is a condenser. Thus, $R_{11}$, $R_{12}$, produce a rectangular pulse of half amplitude, whilst $R_{13}$, $Ca$ produces an integrated wave form, the time constant of $R_{13}$, $Ca$ being such that the sloping front of the pulse has passed half amplitude at the end of the pulse. The dekatron contains an anode and ten counting cathodes, two transfer electrodes being arranged between each pair of cathodes. One set of transfer electrodes is connected to an input terminal $T_1$, and the other set to an input terminal $T_2$, the pulses produced by the potential divider $R_{11}$, $R_{12}$, being applied to $T_1$ and those produced by the potential divider $R_{13}$, $Ca$ being applied to $T_2$. As is known, the effect is that at each successive pulse on the grid of the valve $V_1$ the glow discharge in the dekatron is shifted from one cathode to the next and the whole circuit is able to count at a very high rate, up to say 5 kc./s., or even more.

In FIGURE 4 two driving circuits each similar to that of FIGURE 3 are cross connected to operate a cold cathode dekatron tube in opposite directions. The two circuits include tubes or valves $V_{11}$ and $V_{12}$ respectively, the input to one being the pulsed speed signal and to the other being the pulsed reference frequency. When a pulse reaches the grid of valve $V_{11}$, the pulse from its anode is divided into a direct pulse at A and a delayed pulse at B, and these are applied to $T_1$ and $T_2$ of the dekatron tube, respectively, through rectifiers $N_A$ and $N_B$. Thus a pulse applied to $V_{11}$ will cause the glow in the dekatron to move in (say) a clockwise direction.

Similarly when a pulse reaches the grid of valve $V_{12}$ it produces a direct pulse at D and a delayed pulse at C. These are coupled to $T_2$ and $T_1$ by the rectifiers $N_C$ and $N_D$, respectively. A pulse applied to $V_{12}$ then causes the glow to rotate in a counter-clockwise condition.

When two pulse trains are applied to valve $V_{11}$ and $V_{12}$ the glow advances in a clockwise direction for those on $V_{11}$ and retreats for those on $V_{12}$. It is necessary to ensure that when two pulses coincide or overlap, an incorrect count does not take place. This is ensured by the use of rectifiers for coupling.

Thus, should $V_{11}$ and $V_{12}$ receive pulses simultaneously, $T_1$ and $T_2$ both share the glow from the cathode on which it rested and stay this way for the two delayed pulses so that after the delayed pulses are over and $T_1$ and $T_2$ return to normal, the glow finds its way back to the nearest cathode which is the one it was on. Thus there is no movement.

Should the $V_{11}$ pulse just precede the $V_{12}$ pulse, then the sequence is: pulse moves glow to $T_1$—delayed pulse and new pulse on $V_{12}$ move glow to $T_2$—second delayed pulse moves glow to $T_1$—glow returns to original position. Again there is no resultant movement, as required.

It is unlikely that any particular load and speed will result in the glow being stationary on one cathode—it is more likely that the glow will move back and forward between two cathodes. Thus, instead of obtaining a small number of steps (usually 9), there is a smooth progression between steps from the glow spending nearly all its time on one cathode, through various time ratios shared between two cathodes, to the glow spending all its time on the second cathode and so on. By connecting one cathode (say number 0) so that it cannot support a glow, the device above not only allows the glow to rotate at a speed proportional to the difference in frequency between the two signals—it also indicates (by whether glow remains on cathode 1 or 9), which is the higher frequency. It will be recognized that this is an electrical analogue to the case of a mechanical clutch and stops for the output shaft of a mechanical differential gear.

In order to take an electrical indication or error signal from the circuit to actuate the controller the cathodes can be connected as shown in FIGURES 5 and 6.

In FIGURE 5 the output network comprises a series resistance $R_1$, $R_2$, $R_3$, etc., connected to the respective cathodes and resistances RA, RB, RC, etc., connected between the resistances R1, R2, etc. In FIGURE 6 there are two series resistances $R_1$, $R'_1$, $R_2$, $R'_2$, $R_3$, $R'_3$, etc., connected to each cathode, and another series resistance $r$ is connected between the junction of the resistances $R_1$, $R'_1$, $R_2$, $R'_2$, etc., and the output terminal.

In FIGURE 5, $R_A$, $R_B$ . . . $R_H$ may well be equal resistors or they may be graded in order to compensate for some characteristic of the amplifier and motor or valve being controlled. Resistors $R_1$, $R_2$ . . . $R_9$ need not be used, but if they are, by choosing their values the voltages at each cathode when glowing can be made equal. This helps counting at high speeds. The capacitor CO need not be used, but if it is, by selecting a suitable value the voltage drop (which occurs during transfer when no cathode is glowing) can be prevented without introducing undue time constants. FIGURES 7 and 8 show the wave form at the output terminal as the glow is stepped forward, respectively for a small value of CO, and a large value of CO.

The output from the circuit of FIGURE 5 or FIGURE 6 can be used directly to control any motor, regulating valve or other device through conventional amplifiers. Additional smoothing, differentiation, integration, or similar operations can be used to increase the overall stability of the system in the usual way.

To provide a larger range a number of selector switches or counting tubes may be operated in cascade, each additional switch or tube counting the number of complete rotations of the preceding switch or tube. In the case of switches the circuits well known from telephone exchange operations may be used. In the case of tubes, the bi-directional coupling can be obtained by coupling each counting tube to the succeeding one by means of a circuit like that in FIGURE 4. A pulse is fed to valve $V_1$ when the glow leaves cathode 9 for terminal $T_1$ and a pulse is fed to valve $V_2$ when the glow leaves terminal $T_1$ for cathode 9. By adopting this particular arrangement, false indications are prevented when the count is oscillating between numbers like 999 and 1000. A circuit which uses a pentode say, with a voltage derived from cathode 9 and maintained for about the time of one transfer pulse by a suitable time constant applied to turn one grid on, transfer pulses on the terminal $T_1$ simultaneously turning on the suppressor grid, will produce an output pulse when the glow leaves cathode 9 for terminal $T_1$ (i.e., towards cathode 0).

Similarly if $T_1$ pulses maintained by a time constant are applied to one grid of another such circuit and voltage on 9 to the other grid, an output pulse would be obtained when the glow left $T_1$ for 9 but not when it left $T_1$ for any other electrode.

It may be necessary in both cases to have a pulse shaping stage between these discriminating circuits and the drive circuits they would feed.

Such a multi-decade bi-directional counter capable of dealing with two simultaneous trains of randomly spaced or regular pulses could be connected with cathode circuits like that shown in FIGURE 4 to give a hundred steps or even a thousand, of output voltage, or alternatively the first decade might operate an electronic fine control while the second might operate an electro-mechanical coarse control.

Two motor speed controllers according to the invention are illustrated as block diagrams in FIGURES 9 and 10.

In FIGURE 9 a direct current motor 2 from which a drive at a very closely controlled speed is to be taken is driven by a mains supply passing through a thyratron rectifier and controller 1. The motor 2, in addition to providing a useful drive drives a small alternator 3 which may for example be a phonic wheel. The signal from the alternator 3 passes to an electronic frequency divider 4 the ratio of which may be varied over a range of say 10:1. A batching counter of known type may conveniently be used for this purpose. The divider 4 is set so that at the desired motor speed the output pulses have a frequency which is equal to the standard frequency referred to below. The output pulses are fed into an electronic phase comparator 5 which may be a dekatron tube used as described above. Alternatively, an electro-mechanical comparator such as a selector switch may be used.

A standard frequency for use with the comparator is generated by a signal generator 7 which may be crystal controlled or tuning fork controlled. Since the frequency so produced will normally be too high for direct use this signal may be passed through a fixed ratio electronic frequency divider 8 to produce a reference frequency of the same order as the dependent frequency.

The error signal from the comparator 5 is amplified by a power amplifier 6 to provide a control signal to actuate the controller 1 to maintain the speed of the motor 2 constant.

In the control system in FIGURE 10 the controller 1, motor 2, alternator 3, comparator 5 and power amplifier 6 are similar to the parts described with reference to FIGURE 9.

The reference frequency is, however, produced by a resistance capacity oscillator 16 the frequency of which is continuously variable over a range of say 10:1. The oscillator circuit is designed to provide maximum possible frequency stability over a short period of operation, for example half an hour.

A second reference frequency is produced by a locked oscillator 17 which is crystal or tuning fork controlled and this reference frequency is reduced in a fixed ratio by frequency divider 18. The reduced reference frequency signal controls the operating time of an electronic counter 19 so that the exact frequency of the oscillator 16 may be exactly determined.

The frequency monitor 17, 18, 19 may be switched into the circuit to check the speed of rotation of the motor, or it may be switched to indicate the frequency of the oscillator 16 when setting this to the desired speed and again to allow correction of any variation in the frequency of the oscillator from the set value.

Where in schemes such as that described with reference to FIGURE 9 the reference signal frequency is fixed and it is desired to maintain the motor speed accurately constant at any of a series of different predetermined values, a frequency changer is required which may be arranged to vary appropriately either the motor speed signal or the reference signal before these are applied to the frequency comparator. As above mentioned an electric counter of the kind known as a batching counter, for example incorporating cold cathode counting valves, hard valves or transistors may conveniently be used as a frequency divider for this purpose. Where it is desired to employ direct reading of the predetermined motor speed the frequency divider should be arranged to vary the motor speed signal as in FIGURE 9, the reference signal remaining constant. A four or five decade counter used in this manner will enable the full speed range of a motor to be controlled. For example a 10/1 ratio can be obtained in steps of 0.01 percent. A device such as a phonic wheel at 3, FIGURE 9 with the appropriate number of teeth, may be used to make the number to be set on the batching counter equal to (or a multiple or submultiple by a power of 10) of the desired motor speed. If necessary change speed gearing may be used in association with a phonic wheel or other suitable pulse generator.

Another possible arrangement if direct reading is not essential and which is simpler than that shown in FIGURE 10 is, as shown in FIGURE 11 in which corresponding references are used, to apply to the batching counter 19a to the reference frequency pulses derived from the oscillator 7a to produce a new reference pulse frequency corresponding to that at which the pulses derived at 3 from the motor 2 should occur. The speed is then inversely proportional to the number set on the batching counter but the system has the advantage of deriving information about the motor speed at a much quicker rate, which is helpful where quick response is necessary.

The circuit shown in FIGURE 12 is that of a system similar to that illustrated more diagrammatically in FIGURE 9, and in which again 2 is the D.C. motor the speed of which is to be controlled and 5 is the phase comparator which is here a dekatron tube having an output circuit made up of resistances similar to that of FIGURE 5. So far as some of the resistances shown are made up of two resistors in parallel this is merely an indication that the required value is sometimes more conveniently obtained by using two resistors of standard values in this way.

To drive the dekatron tube 5 a circuit similar though not identical to that of FIGURE 4 is provided together with two input amplifiers, these circuits being included within a block market 21. A signal derived from an alternator not shown but directly coupled to the motor as in FIGURE 9 is applied at terminal TA and amplified in known manner by two triode stages $TR_1$, $TR_2$. The output is applied to a known system consisting of a diode $D_1$ and resistor-capacitor potential dividers $AR_1$, $AR_2$, $AR_3$ and $Ac$ to provide the direct and delayed pulses for the tube 5, through rectifiers NA, NB respectively. A signal of reference frequency produced by any appropriate means described above but not shown is applied at terminal TB and is shaped to produce pulses of a predetermined width by two triode stages $TR_3$, $TR_4$, the width being determined by the values of a capacitor BC and resistor BD. The pulses are then amplified to the correct amplitude by a further tube BE the output of which is then applied to a similar arrangement of diode and potential dividers as that associated with the amplifier for the motor derived frequency, and these pulses are also applied to the tube 5 through rectifiers NC and ND so that as described above with reference to FIGURE 4, the tube 5 counts in one direction for the pulses applied at TA and in the opposite direction for those applied at TB. It will be understood that if preferred the pulse shaping stages could be applied to the motor derived pulses or in any particular case, pulse shaping can be used in both signals.

The components within the block 22 constitute a regulated stabilised power supply for the various tubes and for the motor 2 whereby power from A.C. mains is brought to the correct voltages and rectified as necessary. The details follow standard practice as will be recognised by those skilled in the art and need not therefore be further described. Any other arrangement providing appropriate supplies may be used.

The output circuit of the tube 5 is biased from a potentiometer 37 and the output voltage is applied through a resistor 33 to the control grid of an amplifying tube stage which controls the supply of power from the power supply to the armature of the motor 2. Purely as a matter of convenience the amplifier is shown as comprising three tubes MV in parallel but this number can obviously be varied according to the current carrying capacity of the tubes and the size of the motor. The potentiometer 37 which controls the bias supply to the dekatron tube enables the output of the amplifier to be varied. A switch 34 may be provided to enable the signal from the tube 5 to be by-passed to earth and to connect the cathode 0 to the bias supply from the potentiometer 37 so that the tube can count continuously for test purposes.

To provide for stabilisation, the motor shaft may also carry a small tacho-generator armature TG, the field winding $FW_2$ for which is in series with the field winding $FW_1$ for the armature of the motor 2, these field windings being constantly energised from the power supply. The output from the armature TG after removal of most of the ripple through a capacitor 31, is differentiated by another capacitor 32 and is applied across the resistor 33 thereby to develop a voltage which modifies the control effected by the error signal from the tube 5, thus avoiding violent changes in motor torque. Such a separate tacho-generator is not essential since a similar stabilising signal may be derived from the armature current of the motor 2 itself and or by differentiating the control signal voltage.

Instead of controlling the armature of the motor 2 the controller might be applied to the field or to both.

FIGURE 13 illustrates an alternative to FIGURE 12 in which instead of using tubes transistors are used. Parts of the circuit which would be the same as in FIGURE 12 are not shown. These are the amplifier for the error signal, the controlled motor and the arrangements for stabilisation. Also a power supply circuit is not shown. These elements which correspond to elements of FIGURE 12 have been given the same reference with the suffix $a$ so far as necessary. The circuit is based on that described by Chaplin and Williamson in paper M2440 of the Institution of Electrical Engineers, November 1957. The motor derived pulses are applied at TA$a$ and the reference pulses at TB$a$. The transistor $TR_1$ acts with a transformer $T_1$ and associated components as a blocking oscillator. The transistor $TR_2$ similarly acts with the transformer $T_2$ and associated components as a blocking oscillator. On receipt of a negative triggering pulse via capacitor $C_1$ or $C_4$, large enough to overcome the bias current flowing in diode $D_1$ or $D_{12}$, the circuit produces a positive pulse at the transistor collector immediately followed by a negative pulse of the same width and amplitude.

Both transformers are triple wound and the third winding is used for operating the dekatron tube. Thus the outer ends of the two transformer windings are connected through respective diodes $D_5$, $D_6$ and $D_7$, $D_8$ to the two sets of transfer electrodes of the dekatron. Two resistors $CR_4$ and $CR_5$ are common to both circuits. Another pair of diodes $D_3$, $D_4$ connect the ends of the third winding of the transformer $T_1$ to earth and allow the respective end of the winding to go relatively negative to earth but not positive. Thus when two pulses appear at the output, first diode $D_4$ prevents this end being positive so that the other end goes negative and transmits a negative pulse to the one transfer electrode. As the first pulse ends and the second commences with opposite polarity, owing to the action of diode $D_3$ a negative pulse appears at the other end of the winding and is transmitted to the other transfer electrode. The dekatron thus makes a count of one in one direction. A similar action takes place on the other side but in the opposite direction. The width of the reference pulses can be adjusted by the aid of a resistor $PR_2$ and those of the motor derived pulses by the aid of a resistor $PR_7$.

In general it may be emphasized that the invention enables a very fine control to be exercised without any difficulties arising when the error is large. When the error is large owing to the disconnection of cathode 0 of the dekatron tube in FIGURE 5 or 12 further rotation of the glow is prevented at cathode 1 or 9 as the case may be. The circuit shown in FIGURE 5 enables the position of the glow to be detected electrically because at cathode 1 the cathode circuit goes straight to negative bias (see FIGURES 5 and 12), producing a negative control voltage, and as the glow moves along to cathodes 1, 2, 3 etc., the output voltage rises to less negative or more positive values. This voltage operates the controller. Thus as long as the glow remains on 1 or 9 the controller is at maximum adjustment indicating too fast or too slow and so remains until the frequencies of the two signals become equal and the only difference is a phase difference. It should here be mentioned that the range of phase difference will cover the number of complete cycles provided between the two maxima i.e. the number of pulses of difference between the two signals in going from one maximum to the other.

As long as the phase difference remains the same, it causes the glow to move back and forth evenly between two adjacent cathodes but as soon as a change in the controlled parameter occurs the relative phase alters to give a longer dwell on one cathode and a shorter dwell on the other, appropriate to give the required increase or decrease in voltage, and if necessary the glow will step up or down to provide a still greater or smaller control voltage. This mode of operation is not limited by the limited number of steps but is able to give an infinite variation owing to the effect of phase difference in determining the dwell of the glow on the different cathodes. Broadly speaking a similar effect will be obtained if the comparator is a uniselector switch as in FIGURE 2 though naturally this cannot operate at the same speed as an electronic tube.

As above mentioned not only can several dekatron tubes or uniselector switches be used in cascade to provide a greater number of steps between the maximum and minimum positions but it is also possible to use one counter to effect a fine control and another to effect a coarse control. An example of this is shown in FIGURES 14 and 15. Here the fine example is effected by a dekatron and is applied to control the armature current of the controlled motor while the coarse control which in general does not need to operate at such a high speed as the fine control is effected by a uniselector to give stepwise control to the field current of the motor. As will be understood where the speed of a uniselector is adequate uniselectors may be used for both fine and coarse control. Equally it would be possible to use dekatron tubes for both controls.

As long as the controlled speed is correct and only phase error or no error exists the control by the dekatron may be as described above with reference to FIGURE 12 being applied to the armature of the motor. The provision for adding the coarse control so far as the dekatron tube is concerned involves provision for giving operating pulses to the uniselector when the dekatron steps up from 9 to 0 or steps down from 0 to 9.

The former operating pulse may be derived by the combination shown in FIGURE 14. A sensing stage 41 to which cathode 9 and transfer electrode $T_1$ of the dekatron are connected derives a negative pulse when the glow steps from 9 to $T_1$ and this is utilised to turn on a binary circuit 42 which in turn opens a gate circuit 43 to which the 0 cathode of the dekatron is connected. If the glow now steps on to 0 the resulting pulse passes to the gate 43 and this being open the pulse passes to a pulse amplifier 44 by which an operating pulse of suitable value is passed to the drive coil of the uniselector which is stepped up and thus correspondingly alters the field current of the motor. The pulse passing through the gate 43 also re-sets the binary circuit.

A similar arrangement shown in FIGURE 15 is used to derive another operating pulse when the dekatron counts down from 0 to 9. Here a step from 0 to transfer electrode $T_2$ is sensed at 45 and turns on a binary circuit 46 which then opens a gate 47 which in turn passes the pulse from the cathode 9 to a pulse amplifier 48 by which a suitable operating pulse is given to the driving coil of the uniselector to step it down, a pulse also returning to the binary circuit to re-set it.

The end steps of the uniselector leave the maximum or minimum field resistance switched in as on the previous step but also apply a minimum or maximum armature control signal instead of this coming from the dekatron tube. The dekatron glow continues to rotate showing that the speed is too high or too low and it continues to send pulses to the uniselector at the end of each revolution but the latter being on one or other end stop cannot follow. If the speed at any time reaches the correct value, the above described control recommences.

FIGURE 16 shows one possible circuit of the sensing stage 41 of FIGURE 14. This comprises a coincidence circuit and a pulse shaping circuit which coact to provide an output pulse only when both the transfer electrode $T_1$ receives a pulse (which it may do with the glow on any cathode) and the glow is in the cathode 9. When the glow reaches the electrode 9 a differentiating circuit consisting of a condenser $Cd$ and resistance $Rd$ provides a positive pulse which is without effect on the sensing operating. If a pulse now reaches the transfer electrode $T_1$ a negative pulse is applied to a Schmitt circuit made up of two transistors $TR_3$ and $TR_4$ with appropriate resistances and other elements, while when the glow passes from cathode 9 to the transfer electrode $T_1$ the differentiating circuit produces a negative pulse. When in this way negative pulses are received both from the cathode 9 and from the electrode $T_1$, the Schmitt circuit produces a negative output pulse which passes to the binary circuit 42 as above described. An exactly similar sensing stage is used in FIGURE 15 the connection being to cathode 0 and transfer electrode $T_2$ instead of cathode 9 and transfer electrode $T_1$.

No specific description of the binary circuit, the gate circuit or the pulse amplifier is necessary since circuits of this kind are well known.

In carrying out the present invention the reference frequency may itself be that of pulses derived as the difference of two other frequencies for example by supplying them to a dekatron on the lines as above described with reference to FIGURE 12. The difference so obtained may then be divided by a further stage such as another dekatron tube. This is particularly useful where a reference signal of relatively low frequency e.g., around 50 or 60 cycles per second is required with high accuracy. If such a frequency is produced by the use of one signal at relatively much higher frequency than the other, the accuracy will be more closely related to that of the higher frequency. Thus by using a crystal or tuning fork controlled source for the high frequency a high degree of accuracy of the reference signal can be obtained.

By way of example a range of 58 to 62 c./s. may be provided as the master reference frequency for an alternator control. In this case the higher frequency pulsed signal could be at 6450 c./s. from a quartz crystal or tuning fork. The other pulsed signal could be made variable between 250 and 650 c./s. and derived from a stable resistance capacity oscillator. Such an oscillator is commercially available with an accuracy of ±0.25 percent and a half hour stability of 0.025 percent. The output would then range from 620 to 580 c./s. and after division by ten using a normal dekatron stage would give 62 to 58 c./s. with an accuracy of ±0.025 percent at 62 c./s. and ±0.01 percent at 58 c./s. and a half hour stability of one tenth of the accuracy, adequate in many cases. The resistance capacity oscillator can be checked accurately at 645 c./s. by dividing the quartz crystal frequency by ten using the dekatron stage and comparing with the normal 645 c./s. from the oscillator visually at the differential counter, which again may be a dekatron tube used as above described with reference to FIGURE 10.

By providing a suitable output circuit for the frequency dividing tube, the output can be given a desired wave form to suit the controller. Thus by using an output circuit as in FIGURE 17 together with a smoothing capacitor a good approximation to a sine wave can be obtained. The resistances marked $S_1$, $S_2$, $S_3$ etc., are of increasing values in that order, while those marked $Sa$, $Sb$, $Sc$, $Sd$ and $Se$ increase up to $Sc$ and then fall. The actual values depend on the other components of the circuit and the constants of the tube itself. The output circuit shown in FIGURE 18 together with a smoothing capacitor gives a good approximation with square wave form.

It should be mentioned that this scheme has a limitation due to the digital nature of the mode of operation. For this reason though the average frequency of the output signals depends only on the frequencies of the two pulsed signals, the time of each successive output is always determined by a whole number of pulses. The relative frequencies of the two signals result in many cases in the number of pulses per cycle varying by one at intervals.

Finally it should be mentioned that when dekatron or similar electronic tubes are used, it is possible to simplify the output circuits if the transfer electrodes instead of being terminals have separate leads brought out of the tube from the electrodes between 9 and 0, as described by Branson in Electronic Engineering 27,266 (1955).

I claim:
1. Apparatus for controlling the speed of a cyclically moving machine part comprising means for producing a train of electrical pulses at a frequency dependent upon the speed of the machine part, means for producing a train of reference electrical pulses at a determined frequency, an electrical comparator to which two said trains of pulses are applied and which counts the difference up to a maximum total only in either direction, the difference constituting an error signal, and a controller actuated by the error signal which varies the speed of the machine part in a direction which reduces the error signal so that as long as the difference counted by the comparator remains at the maximum the controller remains at a corresponding maximum setting until the frequencies of the two said trains reach equality whereupon the comparator produces an error signal dependent upon the phase difference between said two trains.

2. Apparatus according to claim 1 in which the comparator is a capacitor into which the pulses of one signal cause equal increments of voltage to be supplied while the pulses of the other cause the same increments of voltage to be discharged from the capacitor, the voltage across the capacitor constituting the error signal.

3. Apparatus according to claim 1 in which the comparator is an electronic tube such as a dekatron tube.

4. Apparatus according to claim 1 in which the comparator is a plurality of electronic tubes such as dekatron tubes, connected in cascade.

5. Apparatus according to claim 1 in which the comparator is a selector switch having driving means for both directions of movement.

6. Apparatus according to claim 1 including two counters and two controllers, the one counter and controller effecting fine control and at the ends of its range transmitting a signal to the counter for coarse control in the appropriate direction.

7. Apparatus according to claim 1 in which the train of reference pulses is produced by a crystal locked electronic tube oscillator.

8. Apparatus according to claim 1 in which the train of reference pulses is produced by a tuning fork controlled electronic tube oscillator.

9. Apparatus according to claim 1 in which the train of reference pulses is produced by a resistance capacity of electronic tube oscillator.

10. Apparatus according to claim 1 in which the train of reference pulses is produced by an electrical differential comprising an oscillator of an accurately controlled fixed frequency and an oscillator of variable frequency.

11. Apparatus according to claim 10 in which the train of reference pulses is produced by an electronic frequency divider following an electrical differential comprising an oscillator of an accurately controlled fixed frequency and an oscillator of variable frequency.

12. Apparatus according to claim 1 also comprising a frequency changing means connected between the source of at least one of the trains of pulses and the comparator.

13. Apparatus according to claim 12 in which the frequency changing means is a variable range electronic frequency divider.

14. Apparatus according to claim 13 in which the frequency divider is a batching counter.

15. Apparatus according to claim 1 in which the moving machine part is a rotating part and the train of pulses dependent upon the speed thereof is derived by means of a phonic wheel.

16. Apparatus for regulating the speed of an electric motor comprising means actuated by the motor for producing a train of electrical pulses at a frequency dependent on its speed, means for producing a train of reference electrical pulses at a pre-determined frequency, an electrical comparator to which the two trains of pulses are fed and which counts the difference between the two trains up to a predetermined maximum in either direction thereby producing an error signal which once the maximum has been reached and as long as the frequencies of the two trains differ will remain constant at a maximum and have a sign corresponding to the direction of error, while when the speeds are equal as long as there is phase error will be a sequence of steps of alternate sign and of respective length determined by a phase error, and a controller operated by the error signal to vary the speed of the motor in a direction which reduces the error signal.

17. Apparatus as set forth in claim 16 also including a variable frequency monitor and switching means for separately applying the two trains of pulses thereto whereby their frequencies may be checked.

18. Apparatus as set forth in claim 16 wherein said comparator is a dekatron tube and said controller comprises an amplifier including a tube the control grid of which is supplied by the output of the dekatron tube, the output of the amplifier constituting the supply to one of the armature and field of the controlled motor.

19. Apparatus as set forth in claim 18 also comprising a tacho-generator driven by the motor, a differentiating circuit to which the output of the tacho-generator is supplied, a resistance across which the differentiated output is applied, and means for applying the voltage thus developed across the resistance to said control grid in a direction to moderate the control effected by the output of the dekatron tube.

References Cited in the file of this patent

UNITED STATES PATENTS

| | | |
|---|---|---|
| 2,403,921 | Hallborg et al. | July 16, 1946 |
| 2,509,730 | Dome | May 30, 1950 |
| 2,797,378 | Johnson | June 27, 1957 |